(12) United States Patent
Byrne

(10) Patent No.: US 12,342,170 B2
(45) Date of Patent: Jun. 24, 2025

(54) MITIGATING MALWARE IN MEDIA

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/111,500

(22) Filed: Feb. 17, 2023

(65) Prior Publication Data

US 2023/0199501 A1 Jun. 22, 2023

Related U.S. Application Data

(63) Continuation of application No. 17/179,124, filed on Feb. 18, 2021, now Pat. No. 11,601,814.

(51) Int. Cl.
| | |
|---|---|
| *H04W 12/128* | (2021.01) |
| *H04N 21/2343* | (2011.01) |
| *H04N 21/845* | (2011.01) |
| *H04W 12/30* | (2021.01) |

(52) U.S. Cl.
CPC ...... *H04W 12/128* (2021.01); *H04N 21/2343* (2013.01); *H04N 21/8456* (2013.01); *H04W 12/30* (2021.01)

(58) Field of Classification Search
CPC .............. H04W 12/128; H04W 12/30; H04N 21/2343; H04N 21/8456
See application file for complete search history.

(56) References Cited

U.S. PATENT DOCUMENTS

| | | | |
|---|---|---|---|
| 6,938,170 B1* | 8/2005 | Kraft | G06F 21/50 |
| | | | 707/999.005 |
| 8,813,127 B2 | 8/2014 | Liu et al. | |
| 9,710,307 B1* | 7/2017 | Corley | G06F 9/4881 |
| 2003/0137506 A1* | 7/2003 | Efran | G06T 15/205 |
| | | | 345/419 |
| 2011/0060792 A1 | 3/2011 | Ebersviller | |
| 2011/0154164 A1* | 6/2011 | Seo | H04L 1/0071 |
| | | | 714/784 |
| 2012/0265901 A1 | 10/2012 | Swenson et al. | |
| 2017/0223423 A1 | 8/2017 | Hardy | |
| 2018/0288461 A1 | 10/2018 | Funk | |
| 2019/0028758 A1 | 1/2019 | Talvensaari | |
| 2019/0200054 A1* | 6/2019 | Dharmaji | H04L 65/80 |
| 2019/0260814 A1* | 8/2019 | Amini | G08B 13/19695 |
| 2019/0320002 A1* | 10/2019 | Qin | H04N 21/8456 |

(Continued)

OTHER PUBLICATIONS

Office Action for U.S. Appl. No. 17/179,124, mailed on Jul. 25, 2022, Byrne, "Mitigating Malware in Media", 8 pages.

*Primary Examiner* — Michael A Keller
*Assistant Examiner* — Thao D Duong
(74) *Attorney, Agent, or Firm* — Lee & Hayes, P.C.

(57) ABSTRACT

Techniques for neutralizing malicious malware embedded in a media item being sent to a user equipment (UE) are discussed herein. A network device may receive (e.g., intercept) a medial file in transit via a wireless communication network being sent to a UE. The media file may include some type of perceptible content (e.g., audio, video, image data, etc.) as well as malware embedded in the media file. The network device may generate a transcoded media file based on the received media file that includes the perceptible content while neutralizing the malware.

20 Claims, 5 Drawing Sheets

(56) References Cited

U.S. PATENT DOCUMENTS

| | | |
|---|---|---|
| 2019/0334968 A1* | 10/2019 | Hu ......................... H04L 65/80 |
| 2020/0204655 A1* | 6/2020 | Khalid ................. H04L 67/306 |
| 2021/0058656 A1 | 2/2021 | Meng |
| 2021/0058666 A1* | 2/2021 | Kim ................... H04N 21/4621 |
| 2021/0168417 A1 | 6/2021 | Meng et al. |

* cited by examiner

MITIGATING MALWARE IN MEDIA

RELATED APPLICATIONS

This application is a continuation of and claims priority to U.S. patent application Ser. No. 17/179,124, filed Feb. 18, 2021, titled "MITIGATING MALWARE IN MEDIA," the entirety of which is incorporated herein by reference.

BACKGROUND

User equipment (UEs) connected to a telecommunication network (also referred to as "the network") receive media items (e.g., images, audio, and video) that may include embedded malware designed to operate on the UE unbeknownst to a user. The malware may be so closely embedded into the media item itself that the user may trigger its malicious action by rendering the media, or, in some cases, simply receiving the media item on the UE.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
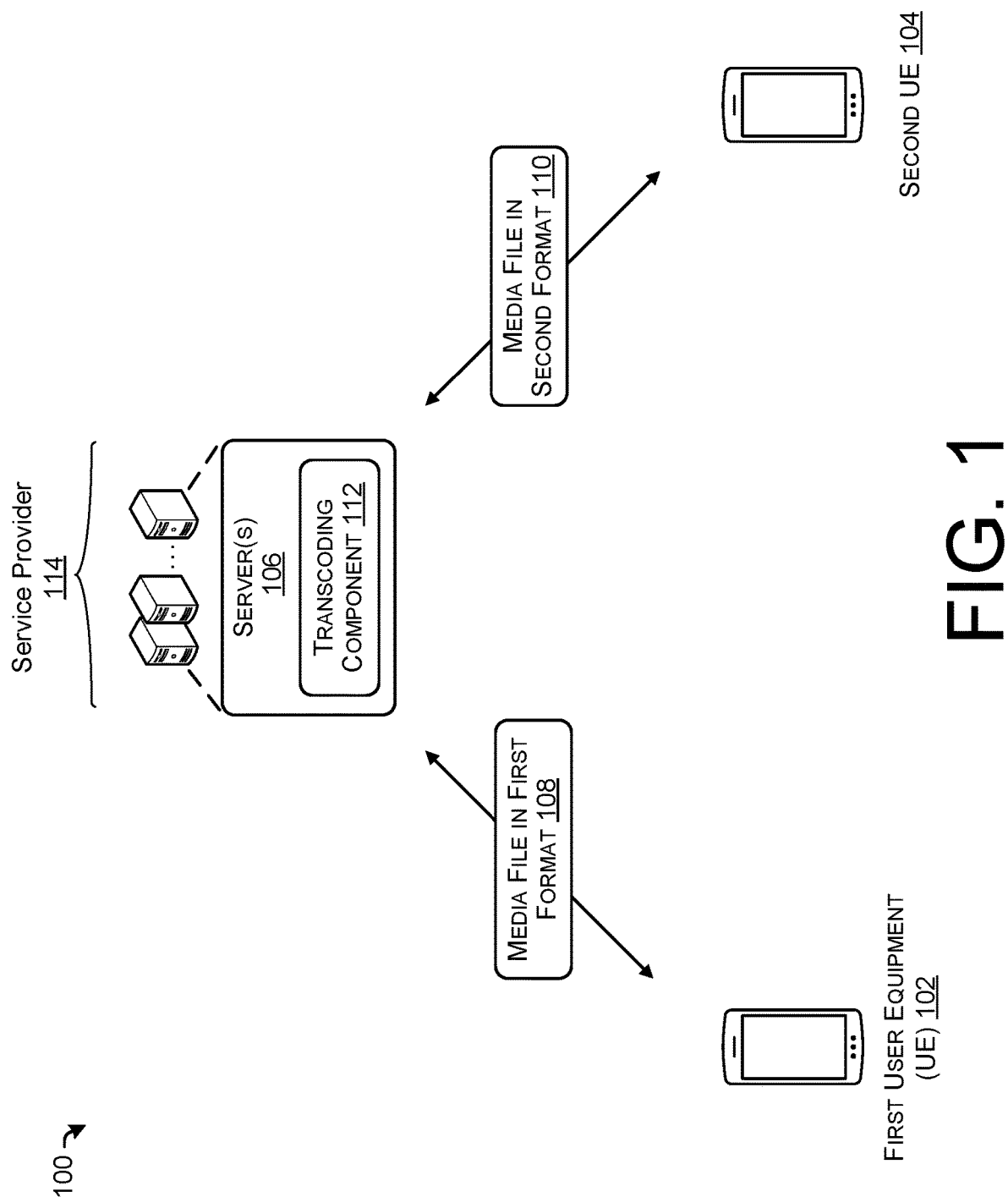
FIG. 1 shows an example network environment in which a media file may be transcoded in a telecommunication network.

Techniques for neutralizing malicious malware embedded in a media item being sent to a user equipment (UE) are discussed herein. A network device may receive (e.g., intercept) a media file in transit via a wireless communication network being sent to a UE. The media file may include some type of perceptible content (e.g., audio, video, image data, etc.) as well as malware embedded in the media file. The network device may generate a transcoded media file based on the received media file that includes the perceptible content while neutralizing the malware. For example, malware included in a media file is often tightly embedded such that changing some of the fundamental parameters of the media file (e.g., transcoding the media file), results in effectively dismantling the malware while leaving the perceptible content of the media file unchanged to be viewed and/or heard by the user. Once the transcoded media file is generated by the network device, it may be sent to the destination UE.

Conventional operations for addressing embedded malware include identifying that malware is present in a data item and attempting to trigger the malware in a secure digital environment (e.g., a malware sandbox). However, these previous methods rely on confidence in an ability to detect the malware as well as certainty that the malware will not escape the secure digital environment, neither of which can be guaranteed.

By intercepting and transcoding media files (also referred herein as media, media items, media messages, etc.) prior to sending the media file to a destination UE, the network device does not rely on needing to detect malware within the media file. Furthermore, neutralizing the malware by changing fundamental parameters of the media file (as opposed to triggering the malware), the network device does not risk the malware escaping and performing malicious actions.

In some cases, a computing device (e.g., a network computing device of a service provider) may receive a media file included in a transmission sent from a first device to a second device. For example, a first device may send a transmission that includes a media file having some type of perceptible content (e.g., audio, video, image data, etc.). In some cases, the media file may also include malware embedded into the perceptible content.

In some examples, the computing device may generate, or otherwise produce, a transcoded media file based on the media file included in the received transmission. For example, transcoding the medial file may include converting the media file into a different digital encoding format, compressing the media file, transrating the media file, transmuxing the media file, resizing the media file, downsizing the media file, changing resolution, downsampling the media file, changing color or pixel depth of the media file, or performing lossy processing of content included in the media file. By changing fundamental parameters of the media file via transcoding, any malware that is embedded in the media file will be neutered and no longer pose a security risk.

In some cases, after the computing device receives the transmission from the first device, the computing device may randomly select a type of transcoding to perform on the media file to generate the transcoded media file. By randomizing the type of transcoding, the process of neutralizing the malware via transcoding cannot be anticipated and malicious entities cannot design malware to interact with a particular type of transcoding.

In some examples, once the transcode media file has been generated, the computing device may send the transcoded media file to the second device. For example, the transcoded media file may include the perceptible content of the original media file such that the perceptible content in the original media file is indistinguishable to human perception from the perceptible content in the transcoded media file.

In some examples, the techniques discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc. This is just one example implementation and other examples are discussed throughout this disclosure. Example implementations are provided below with reference to the following figures.

FIG. 1 shows an example network environment 100 in which a first UE 102 and a second UE 104 can connect to a telecommunication network to engage in communication sessions for voice calls, video calls, messaging, data transfers, and/or any other type of communication. The first UE 102 and/or the second UE 104 can be any device that can wirelessly connect to the telecommunication network. In some examples, the first UE 102 and/or the second UE 104 can be a mobile phone, such as a smart phone or other cellular phone. In other examples, the first UE 102 and/or the second UE 104 can be a personal digital assistant (PDA), a media player, a tablet computer, a gaming device, a smart watch, a hotspot, a personal computer (PC) such as a laptop, desktop, or workstation, or any other type of computing or communication device.

The telecommunication network can be provided by a service provider 114 and have one or more access networks that include base stations and/or other access points, as well as server(s) 106 linked to the access network. The access networks and/or the server(s) 106 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The first UE 102 and/or the second UE 104 can wirelessly connect to one or more base stations or other access points of the access networks, and in turn be connected to the server(s) 106 via the base stations or other access points. In some examples, the server(s) 106 can be a packet core network of an LTE network, which may be referred to as an Evolved Packet Core (EPC). In other examples, the server(s) 106 can be a 5G core network.

The access networks can include base stations that communicate with the first UE 102, the second UE 104, the server(s) 106, as well as other UEs and other base stations not illustrated in FIG. 1. In some cases, the base stations may be associated with an LTE access network known as an Evolved UMTS Terrestrial Radio Access Network (E-UTRAN). Base stations of the LTE access network can be known as eNBs. In some cases, the base stations may be associated with a 5G access network with base stations known as gNBs.

In some cases, the server(s) 106 (e.g., a network computing device of a service provider) may receive a media file 108 included in a transmission sent from the first UE 102 to the second UE 104. For example, the first UE 102 may send a transmission that includes the media file 108 having some type of perceptible content (e.g., audio, video, image data, etc.). In some cases, the media file 108 may also include malware embedded into the perceptible content.

In some examples, the server(s) 106 may generate, or otherwise produce, a transcoded media file 110 based on the media file 108 included in the received transmission. For example, a transcoding component 112 of the server(s) 106 may transcode the media file 108 thereby generating the transcoded media file 110. In some cases, transcoding the medial file 110 may include converting the media file 108 into a different digital encoding format, compressing the media file 108, transrating the media file 108, transmuxing the media file 108, resizing the media file 108, downsizing the media file 108, changing resolution, downsampling the media file 108, changing color or pixel depth of the media file 108, or performing lossy processing of content included in the media file 108. By changing fundamental parameters of the media file 108 via transcoding with the transcoding component 112, any malware that is embedded in the media file 108 will be neutered and no longer pose a security risk to the second UE 104.

In some cases, after the server(s) 106 receives the media file 108 from the first UE 102, the server(s) 106 may randomly select a type of transcoding to perform on the media file 108 to generate the transcoded media file 110. By randomizing the type of transcoding, the process of neutralizing the malware via transcoding cannot be anticipated and malicious entities cannot design malware to interact with a particular type of transcoding.

In some examples, once the transcode media file 110 has been generated, the server(s) 106 may send the transcoded media file 110 to the second UE 104. For example, the transcoded media file 110 may include the perceptible content of the original media file 108 such that the perceptible content in the original media file 108 is indistinguishable to human perception from the perceptible content in the transcoded media file 110. Once the second UE 104 receives the transcoded media file 110, the perceptible content included in the transcoded media file 110 may be rendered on the second UE 104.

In some cases, the server 106 may receive the media file 108 and send the transcoded media file 110 via applications running on the first UE 102, the server 106, and/or the second UE 104. For example, the first UE 102 may include an application (e.g., a transcoder application and/or a media rendering application) configured to send and/or receive transmissions that include media files to and/or from the server 106. For example, a transcoder application operating on the first UE 102 may determine that a transmission intended for the second UE 104 includes a media file and, in response, may send the transmission (e.g., the media file 108) to the server 106 to be transcoded. In some cases, once the media file has been transcoded, a media rendering application of the second UE 104 may receive the transcoded media file (e.g., transcoded media file 110) and render the perceivable content located within the transcoded media file on the second UE 104.

Figure 2:
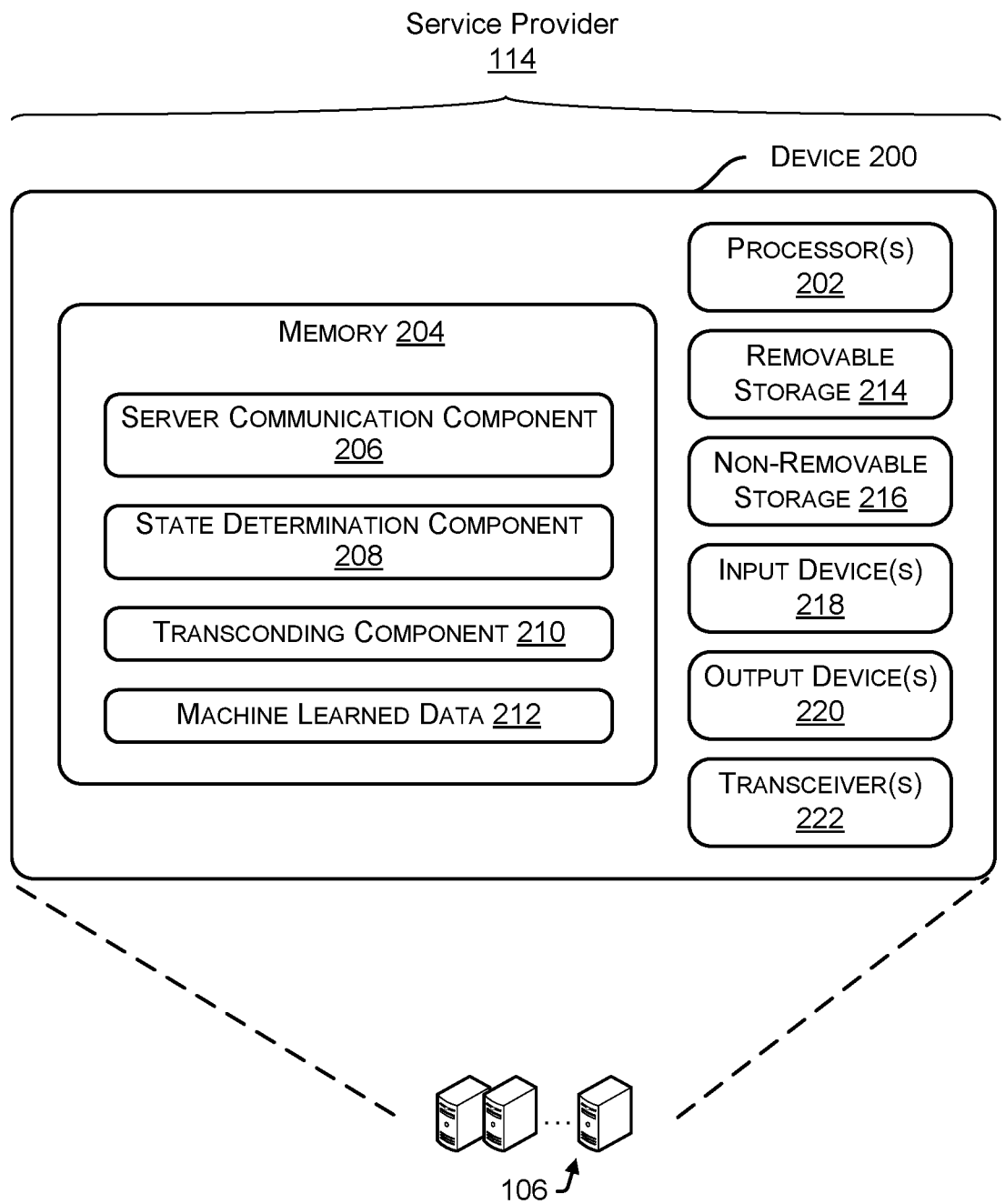
FIG. 2 is a block diagram of a device including a transcoding component.

FIG. 2 is a block diagram of a device 200 including a transcoding component. In some examples, the device 200 can be configured to implement the techniques discussed herein.

FIG. 2 shows only basic, high-level components of the device 200. Generally, the device 200 may comprise and/or may be implemented in any of various network components discussed herein, including those components illustrated in FIG. 1. For example, the device 200 may be implemented in the server(s) 106, which may be associated with the service provider 114, or other network device.

In various examples, the device 200 may include processor(s) 202 and memory 204. Depending on the exact configuration and type of computing device, the memory 204 may be volatile (such as RAM), non-volatile (such as ROM, flash memory, etc.) or some combination of the two. The memory 204 may include a server communication component 206, a state determination component 208, a transcoding component 210, and/or machine learned data 212.

In some examples, the server communication component 206 can be configured to facilitate communications on behalf of one or more devices that subscribe to services offered by the service provider 114. The server communication component 206 can receive calls, messages, and/or data from the first UE 102 and/or the second UE 104 and can transmit the calls, messages, and/or data to other devices associated with the service provider 114 and/or devices associated with other service providers. In at least one example, the server communication component 206 can be configured to transmit messages containing media files, such as the media file 108 and/or the transcoded media file 110, on behalf of the first UE 102. In some examples, the server communication component 206 can transmit combinations of media streams (e.g., RTT, audio, video, etc.) to other device(s) associated with the service provider 114 and/or to other service provider(s) to transmit to other devices.

In some examples, the state determination component 208 can be configured to determine a state of media file functionality associated with a device. In at least one example, a device may be configured to display certain types of media files while being unable to display others. For example, types of media files may include, but are not limited to, video type files (e.g., .MPG, .MP2, .MPEG, .MPE, .MPV, .OGG, .MP4, .M4P, .M4VAVI, .WMV, .MOV, .QT, .FLV, .SWF, AVCHD, etc.), image type files (E.G., .TIF, .TIFF, .BMP, .JPG, .JPEG, .GIF, .PNG, .EPS, .RAW, .CR2, .NEF, .ORF, .SR2, ETC.), and/or audio file types (e.g., .M4A, .FLAC, .MP3, .MP4, .WAV, .WMA, .AAC, etc.). Prior to transcoding a received media file, the state determination component 208 may determine which file types the destination UE (e.g., the second UE 104) supports such that the transcoded media file 110 is not transcoded into a file type unsupported by the destination UE. In some examples, prior to randomly selecting the type of transcoding to be performed on the received media file, the state determination component 208 may generate a list of supported file types associated with the destination UE such that the randomly selected transcoding type is selected from the list of supported file types.

In some examples, the transcoding component 210 may generate, or otherwise produce, a transcoded media file, such as transcoded media file 110 based on the received media file, such as the media file 108, included in the received transmission. For example, the transcoding component 210 (which may be the same or similar to the transcoding component 112 of the server(s) 106) may transcode the media file thereby generating the transcoded media file. In some cases, transcoding the medial file may include converting the media file into a different digital encoding format, compressing the media file, transrating the media file, transmuxing the media file, resizing the media file, downsizing the media file, changing resolution, downsampling the media file, changing color or pixel depth of the media file, or performing lossy processing of content included in the media file. By changing fundamental parameters of the media file via transcoding with the transcoding component, any malware that is embedded in the media file will be neutered and no longer pose a security risk to the second UE 104.

In some cases, after the device 200 receives a media file, the device may randomly select a type of transcoding to perform on the media file to generate the transcoded media file. By randomizing the type of transcoding, the process of neutralizing the malware via transcoding cannot be anticipated and malicious entities cannot design malware to interact with a particular type of transcoding.

In some examples, the machine learned data 212 can include one or more machine learned models or heuristics that can be used to transcode media files included in a received transmission. For example, the machine learned data 212 can include weight(s) for various factors that can be used to set threshold(s) or likelihoods and/or determine factors that increase or decrease threshold(s) or likelihoods, and by how much.

In some examples, a machine learned model can determine which types of transcoding to perform based on a confidence level associated with a predicted outcome being above a threshold level (e.g., such that there is a likelihood above a threshold level that transcoding a media file will eliminate malware, etc.).

In some examples, the machine learned data 212 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the processor(s) 202 is a central processing unit (CPU), a graphics processing unit (GPU), both CPU and GPU, or other processing unit or component known in the art. Furthermore, the processor(s) 202 may include any number of processors and/or processing cores. The processor(s) 202 is configured to retrieve and execute instructions from the memory 204.

The memory 204 can also be described as non-transitory computer-readable media or machine-readable storage memory, and may include removable and non-removable media implemented in any method or technology for storage of information, such as computer executable instructions, data structures, program modules, or other data.

The memory 204 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer readable instructions, data structures, program modules, or other data. The memory 204, the removable storage 214 and the non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The memory 204, the removable storage 214, and/or the non-removable storage 216 may in some cases include storage media used to transfer or distribute instructions, applications, and/or data. In some cases, the memory 204, the removable storage 214, and/or the non-removable storage 216 may include data storage that is accessed remotely, such as network-attached storage that the device 200 accesses over some type of data communications network.

In various examples, any or all of the memory 204, the removable storage 214, and/or the non-removable storage 216 may store programming instructions that, when executed, implement some or all of the function functionality described herein.

The device 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the device 200 also includes one or more wired or wireless transceiver(s) 222. For example, the transceiver(s) 222 can include a network interface card (NIC), a network adapter, a LAN adapter, or a physical, virtual, or logical address to connect to various networks, devices, or components illustrated in figures herein. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMAX, Bluetooth, infrared communication, and the like.

Figure 3:
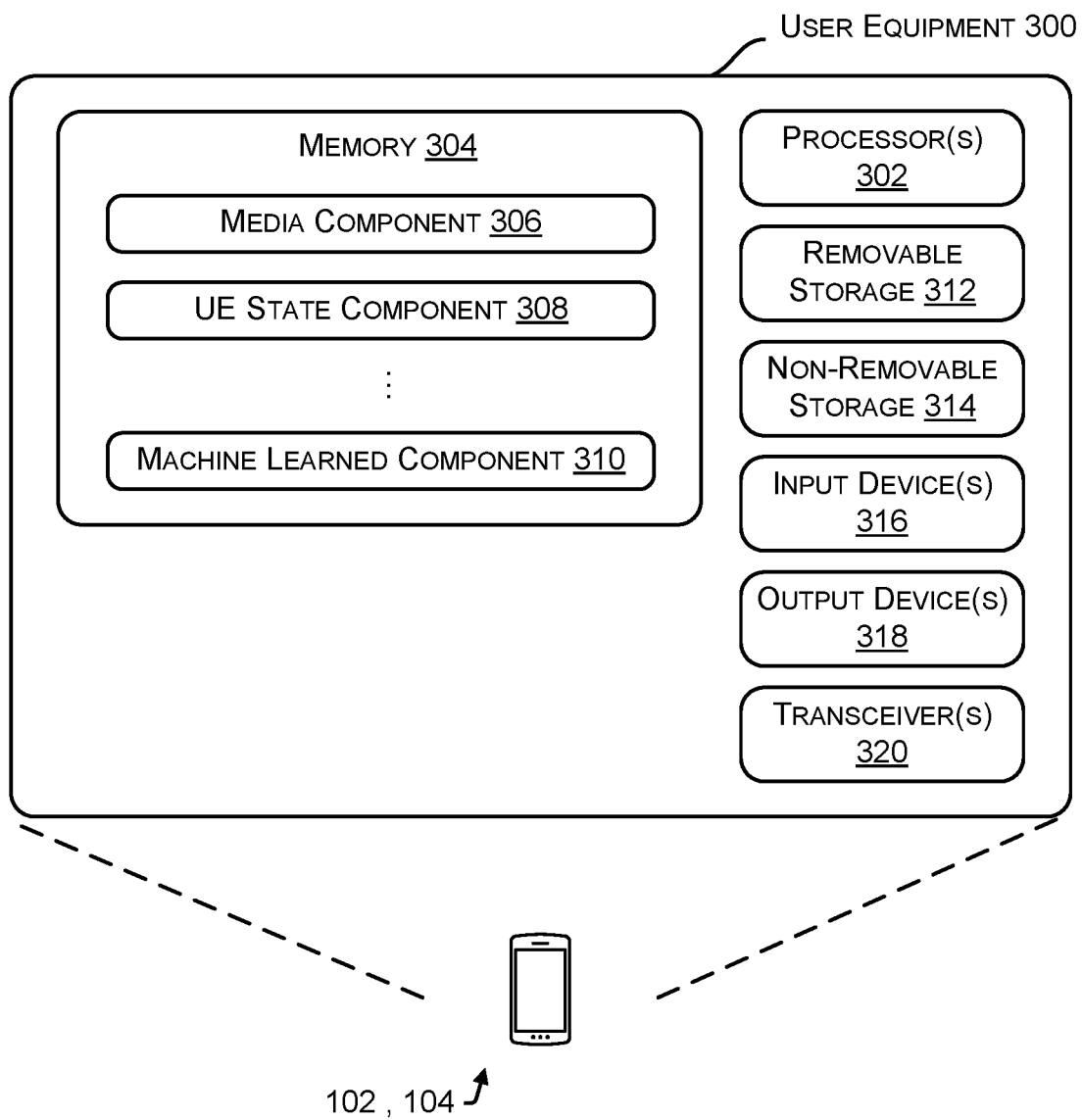
FIG. 3 a block diagram of a device including a media component.

FIG. 3 is a block diagram of a UE 300 including components for sending media files and/or receiving transcoded media files. In some examples, the UE 300 (also referred to as a device 300) can be configured to implement some or all of the techniques discussed herein.

FIG. 3 shows basic, high-level components of the device 300. Generally, the device 300 may comprise and/or may be implemented in any of various network components discussed herein, such as the first UE 102, the second UE 104, and/or other components illustrated in FIG. 1.

In various examples, the device 300 may include processor(s) 302 and memory 304. Depending on the exact configuration and type of computing device, the memory 304 may be volatile (such as RAM), non-volatile (such as ROM, flash memory, etc.) or some combination of the two. The memory 304 may include a media component 306, a UE state component 308, and a machine learned component 310.

In some examples, the media component 306 may enable a UE to send and receive media files. For example, the media component 306 may send a media file, such as the media file 108, to another UE, such as the second UE 104, via the service provider 114. In some cases, the media component 306 may be configured to receive transcoded media files, such as the transcoded media file 110, and to render the perceptible content included in the transcoded media file 110 on the second UE 104. In some cases, the media component 306 may include an application (e.g., a transcoder application and/or a media rendering application) configured to send transmissions that include media files to the server 106. For example, the media component 306 and/or the transcoder application may determine that a transmission intended for the second UE 104 includes a media file and, in response, may send the transmission to the server 106 to be transcoded. In some cases, once the media file has been transcoded, the media component 306 and/or the media rendering application of the receiving device (e.g., the second UE 104) may receive the transcoded media file and render the perceivable content located within the media file.

In some examples, the UE state component 308 can include data representing one or more conditions at the UE. In some examples, the UE state component 308 can represent data about a display status of the UE, sensor data from the UE, an indication that the UE is associated with a low power mode, an amount of power in a battery associated with the UE, a charge state indication associated with the UE, an application associated with the UE, a temperature associated with the UE, types of media file that are supported by the UE, as well as other factors. The UE state component 308 can be input or otherwise provided to the machine learned component 310 (or another model or machine learned component discussed herein) to determine a priority level associated with a data request.

In some examples, the machine learned component 310 can include one or more machine learned models or heuristics that can be used to send/receive media files. For example, the machine learned component 310 can include weight(s) for various factors that can be used to set priority level(s) or likelihoods and/or determine factors that increase or decrease a priority level, and by how much.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from the memory 304.

The memory 304 can also be described as non-transitory computer-readable media or machine-readable storage memory, and may include removable and non-removable media implemented in any method or technology for storage of information, such as computer executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 300 also includes additional data storage devices (removable and/or non-removable) such as, for example, magnetic disks, optical disks, or tape. Such additional storage is illustrated in FIG. 3 by removable storage 312 and non-removable storage 314. Tangible computer-readable media can include volatile and non-volatile, removable and non-removable media implemented in any method or technology for storage of information, such as computer readable instructions, data structures, program modules, or other data. The memory 304, the removable storage 312 and the non-removable storage 314 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The memory 304, the removable storage 312, and/or the non-removable storage 314 may in some cases include storage media used to transfer or distribute instructions, applications, and/or data. In some cases, the memory 304, the removable storage 312, and/or the non-removable storage 314 may include data storage that is accessed remotely, such as network-attached storage that the device 300 accesses over some type of data communications network.

In various examples, any or all of the memory 304, the removable storage 312, and/or the non-removable storage 314 may store programming instructions that, when executed, implement some or all of the function functionality described herein.

The device 300 also can include input device(s) 316, such as a keypad, a cursor control, a touch-sensitive display, voice input device, etc., and output device(s) 318 such as a display, speakers, printers, etc. These devices are well known in the art and need not be discussed at length here.

As illustrated in FIG. 3, the device 300 also includes one or more wired or wireless transceiver(s) 320. For example, the transceiver(s) 320 can include a network interface card (NIC), a network adapter, a LAN adapter, or a physical, virtual, or logical address to connect to various networks, devices, or components illustrated in figures herein. To increase throughput when exchanging wireless data, the transceiver(s) 320 can utilize multiple-input/multiple-output (MIMO) technology. The transceiver(s) 320 can comprise any sort of wireless transceivers capable of engaging in wireless, radio frequency (RF) communication. The transceiver(s) 320 can also include other wireless modems, such as a modem for engaging in Wi-Fi, WiMAX, Bluetooth, infrared communication, and the like.

Figure 4:
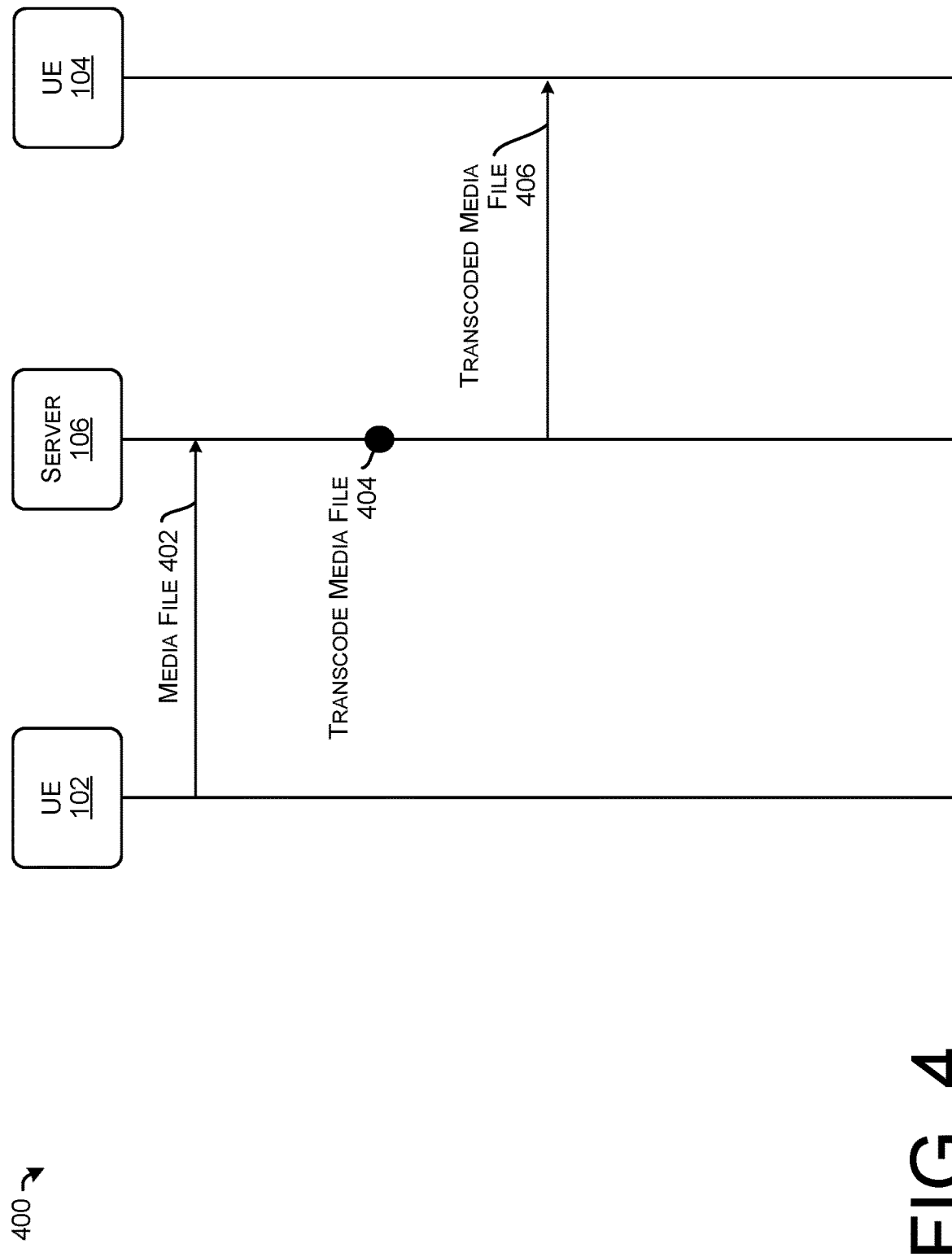
FIG. 4 shows a sequence diagram of example operations and messages a server can use to transcode a media file.
Figure 5:
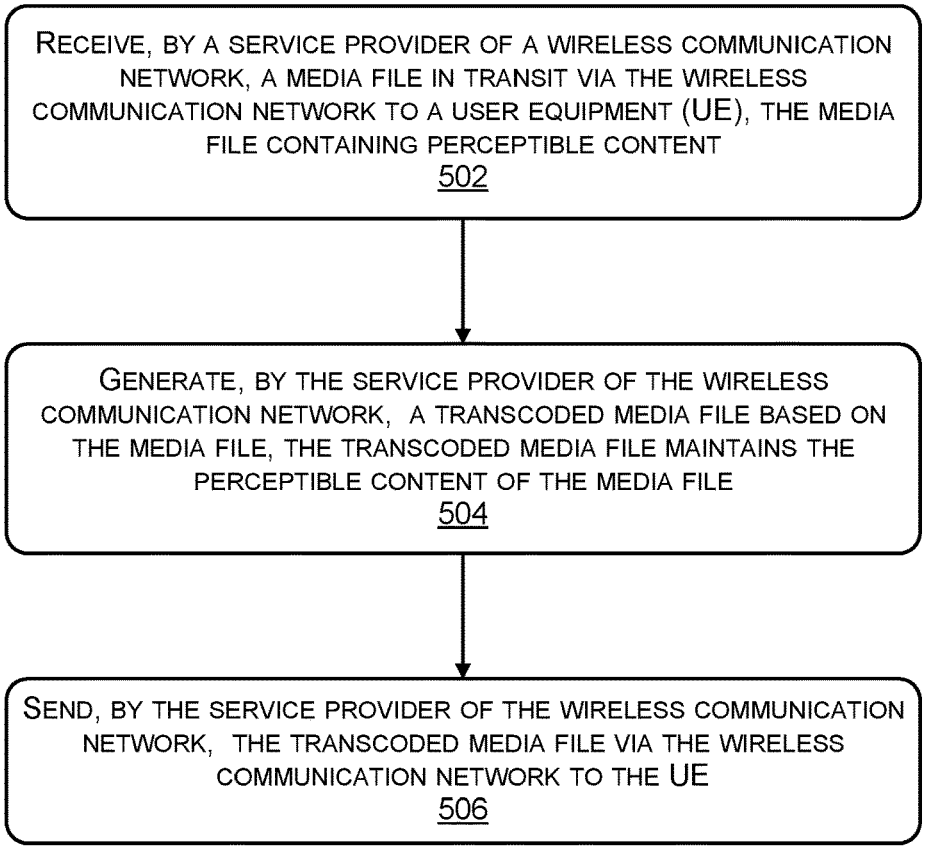
FIG. 5 illustrates an example process for transcoding a media file.

FIGS. 4 and 5 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 4 shows a sequence diagram 400 of example operations and messages a server of a service provider can use to transcode media files.

At point 402, the server(s) 106 (e.g., a network computing device of a service provider) may receive a media file, such as media file 108, included in a transmission sent from the first UE 102 to the second UE 104. For example, the first UE 102 may send a transmission that includes the media file 108 having some type of perceptible content (e.g., audio, video, image data, etc.). In some cases, the media file 108 may also include malware embedded into the perceptible content.

At point 404, the server(s) 106 may generate, or otherwise produce, a transcoded media file, such as the transcoded media file 110, based on the media file 108 included in the received transmission. For example, a transcoding component 112 of the server(s) 106 may transcode the media file 108 thereby generating the transcoded media file 110. In some cases, transcoding the medial file 110 may include converting the media file 108 into a different digital encoding format, compressing the media file 108, transrating the media file 108, transmuxing the media file 108, resizing the media file 108, downsizing the media file 108, changing resolution, downsampling the media file 108, changing color or pixel depth of the media file 108, or performing lossy processing of content included in the media file 108. By changing fundamental parameters of the media file 108 via transcoding with the transcoding component 112, any malware that is embedded in the media file 108 will be neutered and no longer pose a security risk to the second UE 104.

At point 406, once the transcode media file 110 has been generated, the server(s) 106 may send the transcoded media file to the second UE, such as the second UE 104. For example, the transcoded media file 110 may include the perceptible content of the original media file 108 such that the perceptible content in the original media file 108 is indistinguishable to human perception from the perceptible content in the transcoded media file 110. Once the second UE 104 receives the transcoded media file 110, the perceptible content included in the transcoded media file 110 may be rendered on the second UE 104.

FIG. 5 illustrates example process for transcoding media files to neutralize malware. The example process 500 can be performed by the server 106 and/or by the device 200 comprising the transcoding component 210, or another component or device as discussed herein.

At operation 502, the process can include receiving, by a service provider of a wireless communication network, a media file in transit via the wireless communication network to a user equipment (UE), the media file containing perceptible content. For example, the server(s) 106 (e.g., a network computing device of a service provider) may receive a media file 108 included in a transmission sent from the first UE 102 to the second UE 104. For example, the first UE 102 may send a transmission that includes the media file 108 having some type of perceptible content (e.g., audio, video, image data, etc.). In some cases, the media file 108 may also include malware embedded into the perceptible content.

At operation 504, the process can include generating, by the service provider of the wireless communication network, a transcoded media file based on the media file, the transcoded media file maintains the perceptible content of the media file. For example, the server(s) 106 may generate, or otherwise produce, a transcoded media file 110 based on the media file 108 included in the received transmission. For example, a transcoding component 112 of the server(s) 106 may transcode the media file 108 thereby generating the transcoded media file 110. In some cases, transcoding the medial file 110 may include converting the media file 108 into a different digital encoding format, compressing the media file 108, transrating the media file 108, transmuxing the media file 108, resizing the media file 108, downsizing the media file 108, changing resolution, downsampling the media file 108, changing color or pixel depth of the media file 108, or performing lossy processing of content included in the media file 108. By changing fundamental parameters of the media file 108 via transcoding with the transcoding component 112, any malware that is embedded in the media file 108 will be neutered and no longer pose a security risk to the second UE 104.

In some cases, after the server(s) 106 receives the media file 108 from the first UE 102, the server(s) 106 may randomly select a type of transcoding to perform on the media file 108 to generate the transcoded media file 110. By randomizing the type of transcoding, the process of neutralizing the malware via transcoding cannot be anticipated and malicious entities cannot design malware to interact with a particular type of transcoding.

At operation 506, the process can include sending, by the service provider of the wireless communication network, the transcoded media file via the wireless communication network to the UE. For example, once the transcode media file 110 has been generated, the server(s) 106 may send the transcoded media file 110 to the second UE 104. For example, the transcoded media file 110 may include the perceptible content of the original media file 108 such that the perceptible content in the original media file 108 is indistinguishable to human perception from the perceptible content in the transcoded media file 110. Once the second UE 104 receives the transcoded media file 110, the perceptible content included in the transcoded media file 110 may be rendered on the second UE 104.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A method comprising:
receiving, by a service provider of a wireless communication network, a media file in transit via the wireless communication network to a user equipment (UE), the media file containing perceptible content and being of an original data format;
randomly selecting one or more types of transcoding to transcode the media file, wherein the one or more types of transcodings are selected from a group comprising of converting the media file into a different digital encoding format, compressing the media file, transrating the media file, transmuxing the media file, resizing the media file, downsizing the media file, changing resolution, downsampling the media file, changing color or pixel depth of the media file, and performing lossy processing of content included in the media file; and
generating, by the service provider of the wireless communication network and using the one or more types of transcoding, a transcoded media file based on the media file, the transcoded media file maintaining the perceptible content of the media file.

2. The method of claim 1 further comprising determining whether malware is present in the media file while intercepted.

3. The method of claim 1, wherein the perceptible content of media file and the perceptible content of the transcoded media file is indistinguishable to human perception.

4. The method of claim 1, wherein the perceptible content of the media file is selected from a group consisting of image, audio, image and audio, and video.

5. The method of claim 1, wherein receiving, by the service provider of the wireless communication network, the media file comprises intercepting the media file while the media file is in transit to the UE.

6. The method of claim 1, wherein the UE comprises a first UE and the service provider receives the media file from a second UE.

7. The method of claim 1 further comprising sending, by the service provider of the wireless communication network, the transcoded media file via the wireless communication network to the UE.

8. A system comprising:
one or more processors; and
one or more non-transitory computer-readable media storing computer-executable instructions that, when executed, cause the one or more processors to perform operations comprising:
receiving, by a transcoder application of a user equipment (UE), a media file from a wireless communication network, the media file containing perceptible content and being of an original data format;
randomly selecting one or more types of transcoding to transcode the media file, wherein the one or more types of transcodings are selected from a group comprising of converting the media file into a different digital encoding format, compressing the media file, transrating the media file, transmuxing the media file, resizing the media file, downsizing the media file, changing resolution, downsampling the media file, changing color or pixel depth of the media file, and performing lossy processing of content included in the media file; and
generating, using the one or more types of transcoding, a transcoded media file based on the media file, the transcoded media file maintaining the perceptible content of the media file.

9. The system of claim 8, further comprising:
rendering the perceptible content of the transcoded media file; and
presenting the perceptible content on the UE.

10. The system of claim 8, further comprising determining whether malware is present in the media file while intercepted.

11. The system of claim 8, wherein the perceptible content of media file and the perceptible content of the transcoded media file is indistinguishable to human perception.

12. The system of claim 8, wherein the perceptible content of the media file is selected from a group consisting of image, audio, image and audio, and video.

13. The system of claim 8, wherein receiving the media file comprises intercepting the media file while the media file is in transit.

14. The system of claim 8, wherein the UE comprises a first UE and the transcoder application receives the media file from a second UE.

15. The system of claim 8, the operations further comprising sending the transcoded media file to a media rendering application of the UE.

16. A server comprising:
one or more processors; and
one or more non-transitory computer-readable media storing computer-executable instructions that, when executed, cause the one or more processors to perform operations comprising:
receiving, by a service provider of a wireless communication network, a media file in transit via the wireless communication network to a user equipment (UE), the media file containing perceptible content and being of a first file type;
randomly selecting one or more types of transcoding to transcode the media file, wherein the one or more types of transcodings are selected from a group comprising of converting the media file into a different digital encoding format, compressing the media file, transrating the media file, transmuxing the media file, resizing the media file, downsizing the media file, changing resolution, downsampling the media file, changing color or pixel depth of the media file, and performing lossy processing of content included in the media file; and
generating, by the service provider of the wireless communication network and using the one or more types of transcoding, a transcoded media file based on the media file, the transcoded media file maintaining the perceptible content of the media file.

17. The server of claim 16, further comprising determining whether malware is present in the media file while intercepted.

18. The server of claim 16, wherein the perceptible content of media file and the perceptible content of the transcoded media file is indistinguishable to human perception.

19. The server of claim 16, wherein the perceptible content of the media file is selected from a group consisting of image, audio, image and audio, and video.

20. The server of claim 16 further comprising sending the transcoded media file to a media rendering application of the UE.

* * * * *